US012079905B2

United States Patent
Zeng et al.

(10) Patent No.: US 12,079,905 B2
(45) Date of Patent: Sep. 3, 2024

(54) PAGE DISPLAY METHOD AND APPARATUS FOR THIRD-PARTY APPLICATION, AND ELECTRONIC DEVICE

(71) Applicant: GUANGDONG OPPO MOBILE TELECOMMUNICATIONS CORP., LTD., Guangdong (CN)

(72) Inventors: Kaifa Zeng, Guangdong (CN); Linjie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 72 days.

(21) Appl. No.: 17/983,836

(22) Filed: Nov. 9, 2022

(65) Prior Publication Data

US 2023/0071987 A1 Mar. 9, 2023

Related U.S. Application Data

(63) Continuation of application No. PCT/CN2021/086887, filed on Apr. 13, 2021.

(30) Foreign Application Priority Data

May 29, 2020 (CN) .......................... 202010473977.0

(51) Int. Cl.
*G06T 11/00* (2006.01)
*G06F 1/3234* (2019.01)
*G06F 3/147* (2006.01)

(52) U.S. Cl.
CPC .......... *G06T 11/001* (2013.01); *G06F 1/3265* (2013.01); *G06F 3/147* (2013.01)

(58) Field of Classification Search
CPC ...... G06T 11/001; G06F 1/3265; G06F 3/147; G06F 9/451; G09G 2320/066;
(Continued)

(56) References Cited

U.S. PATENT DOCUMENTS 10,109,092 B1 * 10/2018 Hitchings, Jr. ......... G06T 11/60
10,319,116 B1 * 6/2019 C ............................ G09G 5/377
(Continued)

FOREIGN PATENT DOCUMENTS

CN 102855453 A 1/2013
CN 103109267 A 5/2013
(Continued)

OTHER PUBLICATIONS

Gao Lingxiao Power saving method and device applied to OLED screen device, and electronic equipment Feb. 25, 2020 Beijing Science & Tech Co Three Fast Online CN110837289 (A) paragraphs 2-107, figures 1-4 English.*
(Continued)

*Primary Examiner* — Prabodh M Dharia
(74) *Attorney, Agent, or Firm* — Young Basile Hanlon & MacFarlane, P.C.

(57) ABSTRACT

A page display method for a third-party application, includes: when an electronic device enters a power saving mode, in response to a startup instruction for a third-party application, obtaining a background color and a foreground color in the script of the third-party application; adjusting the background color to a first color, and adjusting the foreground color to a second color, wherein a brightness value of the first color is less than a first brightness threshold, a brightness value of the second color is greater than a second brightness threshold, and the first brightness threshold is less than or equal to the second brightness threshold; rendering a background area of the third-party application with the first color and rendering a foreground area of the third-party application with the second color to obtain a page of the third-party application; and displaying the page of the third-party application obtained by rendering.

20 Claims, 7 Drawing Sheets

(58) Field of Classification Search
CPC ....... G09G 2340/0435; G09G 2340/06; G09G 2360/144; G09G 5/363; Y02D 10/00
USPC .................................. 345/520, 604; 382/164
See application file for complete search history.

(56) References Cited

U.S. PATENT DOCUMENTS

| | | | | |
|---|---|---|---|---|
| 10,853,839 | B1* | 12/2020 | Galep | ................ G06Q 30/0244 |
| 2006/0101293 | A1 | 5/2006 | Chandley et al. | |
| 2013/0129206 | A1* | 5/2013 | Worthington | .......... G09G 5/026 |
| | | | | 382/164 |
| 2014/0192281 | A1 | 7/2014 | Smithwick et al. | |
| 2015/0100813 | A1 | 4/2015 | Han et al. | |
| 2016/0078838 | A1* | 3/2016 | Huang | ..................... G09G 5/00 |
| | | | | 345/520 |
| 2016/0225322 | A1 | 8/2016 | Sim et al. | |
| 2017/0286419 | A1* | 10/2017 | Tang | ................ G06Q 30/0241 |
| 2020/0027249 | A1* | 1/2020 | Loughry | .................. G09G 5/02 |
| 2020/0066003 | A1 | 2/2020 | Baldwin et al. | |
| 2022/0284844 | A1* | 9/2022 | Zhang | ..................... G09G 3/20 |

FOREIGN PATENT DOCUMENTS

| | | |
|---|---|---|
| CN | 104268152 A | 1/2015 |
| CN | 105556508 A | 5/2016 |
| CN | 107179889 A | 9/2017 |
| CN | 108604172 A | 9/2018 |
| CN | 110109725 A | 8/2019 |
| CN | 110609722 A | 12/2019 |
| CN | 110837289 A | 2/2020 |
| CN | 111610847 A | 9/2020 |
| WO | 2017152762 A1 | 9/2017 |

OTHER PUBLICATIONS

Gao Lingxiao Power saving method and device applied to OLED screen device, and electronic equipment Feb. 25, 2020 Beijing Science & Tech Co Three Fast Online CN110837289 (A) paragraphs 2-107, figures 1-4 Chinese.*
Gao Lingxiao Power saving method and device applied to OLED screen device, and electronic equipment Feb. 25, 2020 Beijing Science & Tech Co Three Fast Online CN110837289 (A) paragraphs 2-107, figures 1-4 DWGs.*
Anti-aliasing Algorithm for Colored Straight Lines Based on Screen Background Color, Kang Feng'e and Kong Lingdel, Journal of Engineering Graphics, Published on Jun. 15, 2010 ,pp. 62-67.
Chameleon: A Color-Adaptive Web Browser for Mobile OLED Displays, Technical Report 2010-1212, Mian Dong and in Zhong, Published on Jun. 28, 2011, pp. 85-98.
International search report and Written Opinion with English Translation of the International Search Authority, International Application No. PCT/CN2021/086887 malied Jul. 22, 2021 (13 pages).
Chinese first office action with English Translation of CN Application No. 202010473977.0 mailed Aug. 9, 2021 (29 pages).
Notification to Grant Patent Right with English Translation of CN Application No. 202010473977.0 mailed Mar. 22, 2022 (7 pages).
Extended European Search Report for EP Application 21813529.1 mailed Sep. 27, 2023. (8 pages).

* cited by examiner

US 12,079,905 B2

PAGE DISPLAY METHOD AND APPARATUS FOR THIRD-PARTY APPLICATION, AND ELECTRONIC DEVICE

CROSS-REFERENCE TO RELATED APPLICATION(S)

The present application is a continuation-application of International (PCT) Patent Application No. PCT/CN2021/086887, filed on Apr. 13, 2021, which claims the priority of the Chinese patent application No. 202010473977.0, filed on May 29, 2020, the contents of both of which are incorporated herein in their entireties.

TECHNICAL FIELD

The present disclosure relates to the field of computers, and in particular to a method of displaying a page of a third-party application, an electronic device and a computer-readable storage medium.

BACKGROUND

As the computer technology develops, in order to save power of an electronic device, a manufacturer of the electronic device has developed a power saving mode. When the power saving mode of the electronic device is switched on, systemic applications or functions that are inherently installed in the electronic device may be processed, such as closing the systemic application that is inherently installed in the electronic device, closing a positioning function, closing a vibration function, and so on. In this way, power consumption of the electronic device may be saved, and a time length that the electronic device consumes the power may be extended.

However, after the power saving mode is switched on for the electronic device, a traditional method of displaying a page of a third-party application is applied, causing a technical problem of high power consumption.

SUMMARY

According to the present disclosure, a method of displaying a page of a third-party application, an apparatus, an electronic device and a computer-readable storage medium are provided.

According the present disclosure, a method of displaying a page of a third party application is provided and includes:
  Obtaining a background color and a foreground color in scripts of the third party application, in response to an activation command of activating the third party application and in response to an electronic device entering a power saving mode;
  adjusting the background color to a first color and adjusting the foreground color to a second color, wherein a brightness value of the first color is less than a first brightness threshold, a brightness value of the second color is greater than a second brightness threshold, and the first brightness threshold is less than or equal to the second brightness threshold;
  taking the first color to render a background region of the third party application, and taking the second color to render a foreground region of the third party application, to obtain a page of the third party application; and;
  displaying the rendered page of the third party application.

An electronic device includes a memory and a processor. The memory stores a computer program, the computer program, when being executed by the processor, enables the processor to perform the operation of the method of displaying the page of the third party application according to the above description.

A computer-readable storage medium has a computer program stored. The computer program, when being executed by a processor, is configured to implement the operation of the method of displaying the page of the third party application according to the above description.

BRIEF DESCRIPTION OF DRAWINGS

In order to illustrate technical solutions in the embodiments or in the related art of the present disclosure more clearly, the accompanying drawings used in the description of the embodiments or the related art will be briefly described in the following. Apparently, the drawings in the following description show only some embodiments of the present disclosure, and other drawings may be obtained by any ordinary skilled person in the art based on these drawings without any creative work.

DETAILED DESCRIPTION

In order to make the purpose, technical solutions and advantages of the present disclosure to be clearer and more understandable, the present disclosure is described in further detail below by referring to the accompanying drawings and embodiments. It shall be understood that the specific embodiments herein are described to explain the present disclosure only, and do not limit the scope of the present disclosure.

It shall be understood that, terms "first" and "second" are used for describe various elements, but the elements are limited by the terms. These terms are only used to distinguish a first element from another element. For example, without departing from the scope of the present disclosure, the first color may be referred to as the second color, and similarly, the second color may be referred to as the first color. Both the first color and the second color are colors, but they are not a same color.

Figure 1:
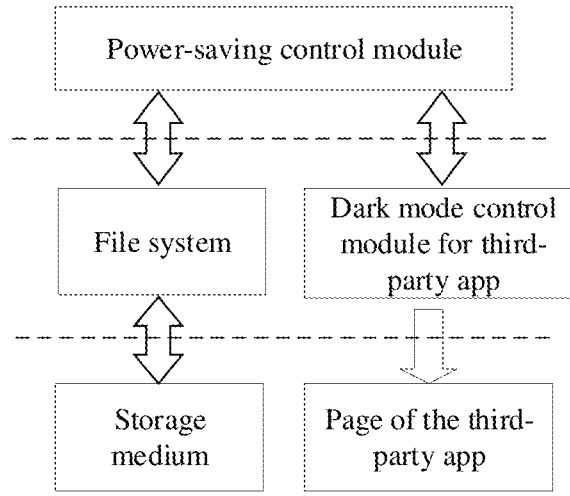
FIG. 1 is an architectural diagram of a method of displaying a page of a third party application according to an embodiment of the present disclosure.

FIG. 1 is an architectural diagram of a method of displaying a page of a third party application according to an embodiment of the present disclosure. When the electronic device enters a power saving mode, a power saving control module may invoke a third party dark control module. The page of the third party application may be obtained through the third party dark control module, and the electronic device may display the obtained page of the third party application.

Further, before the electronic device enters the power saving mode, a state of the third party application and a state of a systemic application may be obtained through a file system, and data, such as the state of the third party application and the state of the systemic application, may be stored in a storage medium. After the electronic device exits the power saving mode, the data, such as the state of the third party application and the state of the systemic application, may be obtained from the storage medium, and the data may be restored.

Figure 2:
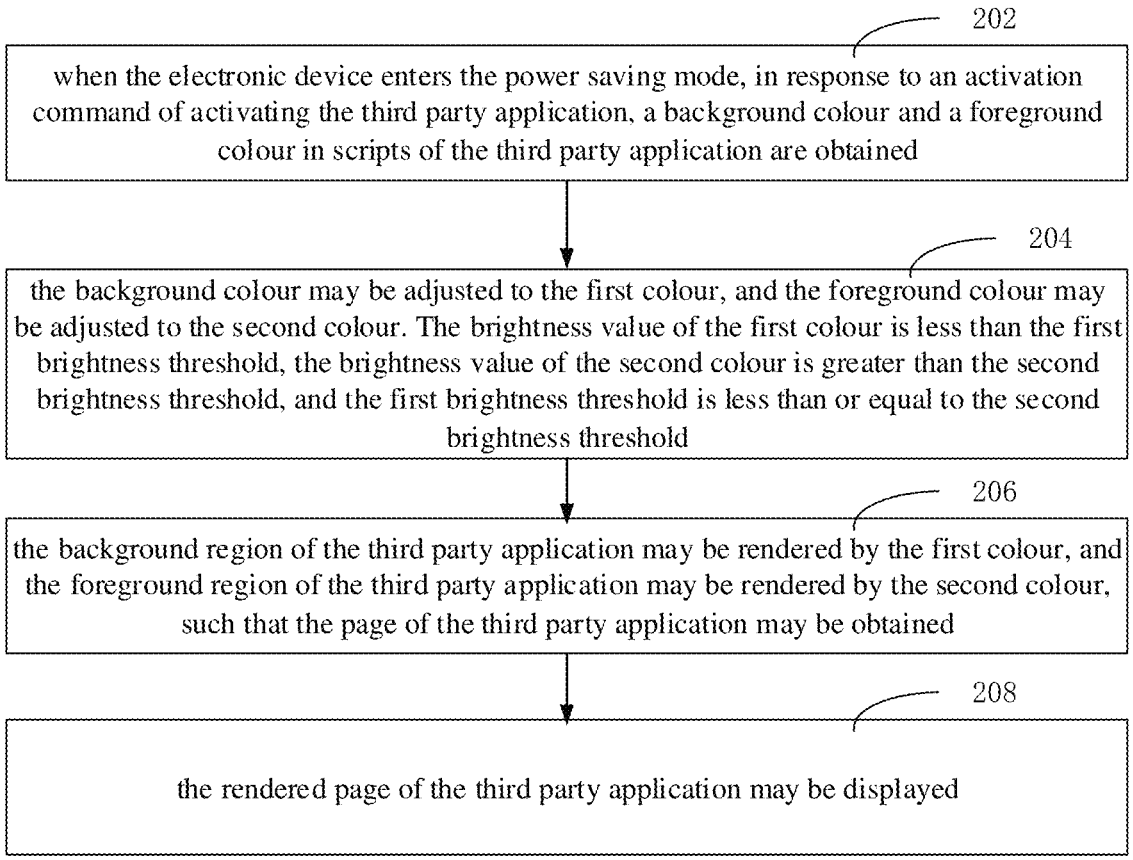
FIG. 2 is a flow chart of a method of displaying a page of a third party application according to an embodiment of the present disclosure.

FIG. 2 is a flow chart of the method of displaying the page of the third party application according to an embodiment of the present disclosure. As shown in FIG. 2, the method of displaying the page of the third party application may include operations 202 to operations 208.

In an operation 202, when the electronic device enters the power saving mode, in response to an activation command of activating the third party application, a background color and a foreground color in scripts of the third party application are obtained.

It shall be understood that, the power saving mode allows the electronic device makes to consume less power, extending a time length that the electronic device consumes power of a battery. In the power saving mode, the number of applications that can be run may be limited, and some features or functions that consume a large amount of power may be turned off or disabled, such as turning off navigation, turning off Bluetooth, turning off vibration, and so on. Non-essential applications may be cleared, and self-launching and associated-launching of the non-essential applications may be restricted. Further, parameters of a central processing unit (CPU) may be adjusted to reduce power consumption of the CPU. The electronic device may further reduce a refreshing rate of the screen, and so on.

In an embodiment, an activation command of activating the power saving mode may be received on a display interface of the power saving mode, and the electronic device may enter the power saving mode.

Figure 3A:
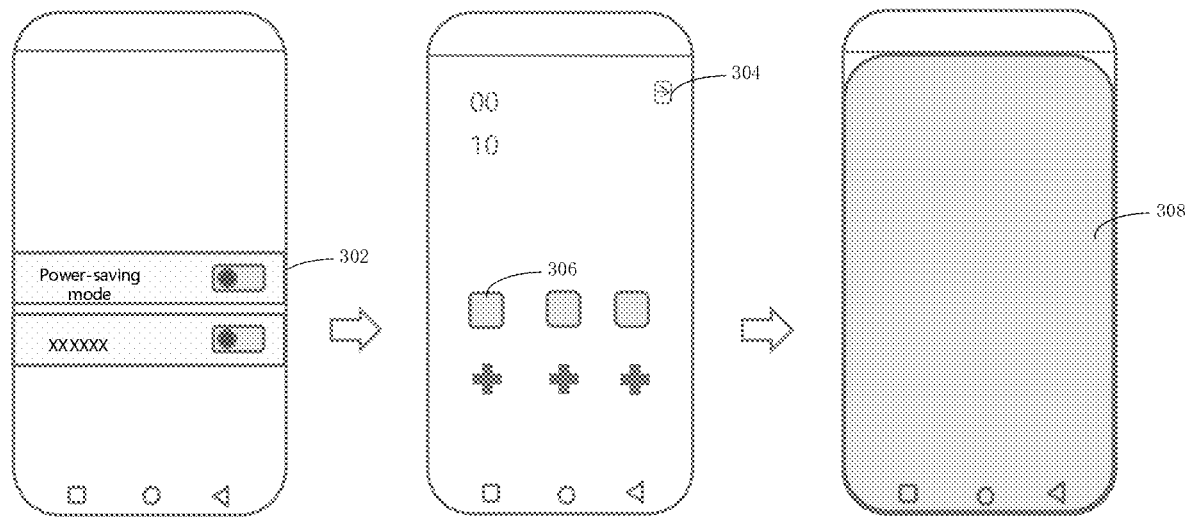
FIG. 3*a* is a schematic view of an electronic device entering a power saving mode according to an embodiment of the present disclosure.

As shown in FIG. 3a, on the display interface of the power saving mode, when a user clicks a switch in a power saving mode control 302, that is, the electronic device receives the activating command of activating the power saving mode and enters the power saving mode. In the power saving mode, the user may click an exit control 304 to exit the power saving mode.

When the user clicks the third-party application 306, an activation command of activating the third-party application 306 may be generated. In response to the activation command of activating the third-party application, a background color and a foreground color in scripts of the third-party application may be obtained. The background color may be adjusted to a first color, and the foreground color may be adjusted to a second color. A brightness value of the first color is less than a first brightness threshold, a brightness value of the second color is greater than a second brightness threshold. The first brightness threshold is less than or equal to the second brightness threshold. A background region of the third party application may be rendered by the first color, and a foreground region of the third party application may be rendered by the second color, such that a page of the third-party application may be obtained. The rendered page 308 of the third-party application may be displayed.

In another embodiment, a power level of the electronic device may be detected. When the power level is less than a power threshold, a power saving mode pop-up window may be generated, and the pop-up window may be displayed on the display interface of the screen. The activation command of activating the power saving mode performed on the pop-up window may be received, and the electronic device may enter the power saving mode.

Figure 3B:
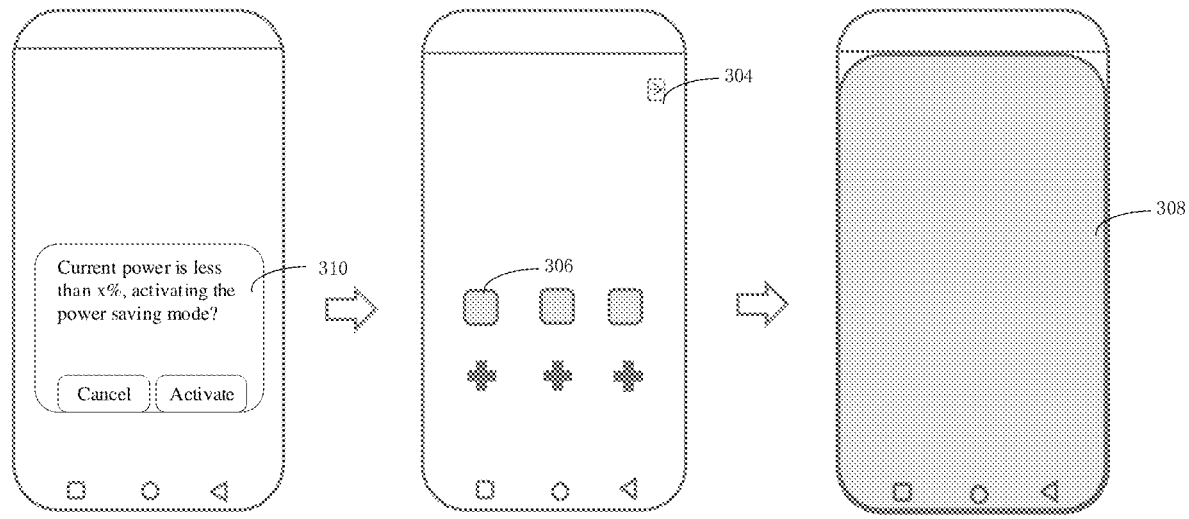
FIG. 3*b* is a schematic view of an electronic device entering a power saving mode according to another embodiment of the present disclosure.

As shown in FIG. 3b, when the power level is less than the power threshold, a power saving mode pop-up window 310 may be generated, and the pop-up window may be displayed on the display interface of the screen to indicate the user that a current power level of the electronic device may be low and suggest the user to turn on the power saving mode. In the power saving mode pop-up window, two buttons, a switched-on button and a switched-off button, are included. When the user clicks the switched-on button, that is, the electronic device receives the activation command of activating the power saving mode performed on the pop-up window and enters the power saving mode. In the power saving mode, the user may click the exit control 304 to exit the power saving mode.

When the user clicks the third-party application 306, the activation command of activating the third-party application may be generated. In response to the activation command of activating the third-party application, the background color and the foreground color in the scripts of the third-party application may be obtained. The background color may be adjusted to the first color, and the foreground color may be adjusted to the second color. The brightness value of the first color is less than the first brightness threshold, and the brightness value of the second color is greater than the second brightness threshold. The first brightness threshold is less than or equal to the second brightness threshold. The background region of the third party application may be rendered by the first color, and the foreground region of the third party application may be rendered by the second color, such that the page of the third party application may be obtained, and the rendered page 308 of the third party application may be displayed.

In another embodiment, a voice may be received, the voice may be analyzed, and an analysis result may be obtained. When the activation command of activating the power saving mode is included in the analysis result, the electronic device may enter the power saving mode.

Figure 3C:
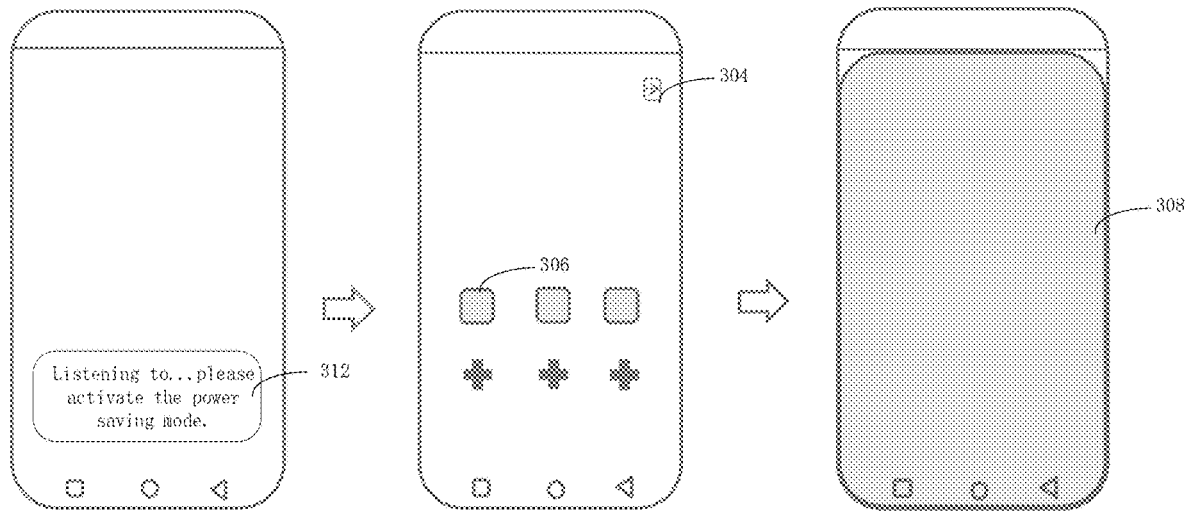
FIG. 3*c* is a schematic view of an electronic device entering a power saving mode according to another embodiment of the present disclosure.

As shown in FIG. 3c, the voice may be received, the voice may be analyzed, and an analysis result 312 may be obtained. The activation command of activating the power saving mode, "please activate the power saving mode for me", is included in the analysis result 312, and the electronic device may enter the power saving mode. In the power saving mode, the user may click the exit control 304 to exit the power saving mode.

The 306 represents the third party application. When the user clicks the third-party application 306, the activation command of activating the third-party application may be generated. In response to the activation command of activating the third-party application, the background color and the foreground color in the scripts of the third-party application may be obtained. The background color may be adjusted to the first color, and the foreground color may be adjusted to the second color. The brightness value of the first color is less than the first brightness threshold, and the brightness value of the second color is greater than the second brightness threshold. The first brightness threshold is less than or equal to the second brightness threshold. The background region of the third party application may be rendered by the first color, and the foreground region of the third party application may be rendered by the second color, such that the page of the third party application may be obtained, and the rendered page 308 of the third party application may be displayed.

It shall be understood that, the electronic device is installed with systemic applications inherently, such as the system desktop, the settings, the browser, the application store, the calculator, the camera, the contact list and so on. The systemic applications may enable basic functions for the electronic device, such as displaying the system desktop, setting functions, browsing a web, downloading applications from the application store, performing calculations, capturing photos, phone calling, and so on. The third party application is developed by a third party application developer and uploaded to a server. The electronic device may download the third party application from the server via a network. The third party application may be, such as WeChat, Mobile QQ, Headline, Gaode Map, Weibo, Taobao, and so on.

The scripts of the third party application may include codes of the page of the third party application to be displayed. The codes may include information, such as the background color and the foreground color of the page of the third party application to be displayed. The background color refers to a color of the background region of the page of the third party application, and the foreground color refers to a color of the foreground region of the page of the third party application.

To be noted that, the number of background regions of the page of the third party application to be displayed may be one or at least two. For example, the page of the third party application to be displayed may include a navigation bar and a contact list. The page of the third party application to be displayed may include a background region for the navigation bar and a background region for the contact list. Accordingly, the number of background colors may be one or at least two.

Similarly, the number of foreground regions of the page of the third party application to be displayed may be one or at least two. The foreground region may include various elements, such as texts, an icon, a photo, a video, an audio, and so on. Accordingly, the number of foreground colors may be one or at least two. The foreground color may refer to a color of each of the various elements in the foreground region, such as a color of the texts, a color of the icon, a color of a frame of the photo, a color of a frame of the video, a color of a control where the audio is located, and so on.

The scripts of third party application may further include a size and a style of the background region where the background color is located, and a size and a style of the foreground region where the foreground color is located.

In detail, when the electronic device enters the power saving mode, in response to receiving the activation command of activating the third-party application, the electronic device may look for a background label and a foreground label from the scripts of the third party application, and obtain the background color corresponding to the background label and the foreground color corresponding to the foreground label.

In the scripts of the third party application, a View by default includes two parts: a background and a content. The background label may be "background", and may be set based on user's demands. The foreground label can be any label other than the background label. In the background label or the foreground label, the color or the drawable may be set. The draw method in the drawable may be customized. The content may be a content drawn in the draw and onDraw method in the View. The background and content may be drawn by invoking the drawText method.

When the element in the foreground region is an image, sampling may be performed on the image to obtain color values of at least two pixels. A color value of each of the at least two pixels may be counted, and the number of pixels having a same color value may be obtained. The maximum number of pixels having the same color value may be divided by the number of the at least two pixels, obtaining a number ratio. When the number ratio is greater than or equal to a ratio threshold, the image may be a pure color image. When the number ratio is less than the ratio threshold, the image may not be the pure color image.

For example, the electronic device may performing sampling on an image and obtain color values of 100 pixels. The electronic device may count the color values of the 100 pixels. 98 pixels are in white, 1 pixel is in black, and 1 pixel is in blue. That is, the maximum number of pixels having the same color value is 98, and 98 is divided by 100, obtaining a number ratio of 0.98. When the ratio threshold is 0.95, the image may be a pure color image.

Further, when the image is the pure color image, the electronic device may detect whether the brightness value of the pure color image is greater than a predetermined brightness threshold. When the brightness value of the pure color image is greater than the predetermined brightness threshold, the image may be the pure color bright image, and color inversing may be performed on the image.

In detail, the electronic device may obtain an RGB value of the color of the pure color image, convert the RGB value into a LAB value, and take an L channel value of the LAB value as the brightness value of the pure color image.

The RGB (red, green, blue) values may refer to three channel values of the foreground color, i.e., a red channel, a green channel and a blue channel. The three channel RGB values may be fused to obtain the foreground color.

The LAB may be a color mode and may have three channel values, a brightness channel L and two color channels A and B. The A represents a component from green to red, and the B represents a component from blue to yellow.

In an operation 204, the background color may be adjusted to the first color, and the foreground color may be adjusted to the second color. The brightness value of the first color is less than the first brightness threshold, the brightness value of the second color is greater than the second brightness threshold, and the first brightness threshold is less than or equal to the second brightness threshold.

The brightness value is a numerical value that indicates how bright a color is. The higher the brightness value, the brighter the color; the lower the brightness value, the darker the color. The first brightness threshold and the second brightness threshold may be set based on the user's demands. The electronic device may preset a first color and a second color. The brightness value of the first color being less than the first brightness threshold may indicate that the first color may be dark, i.e. the background color may be adjusted to a darker color. The brightness value of the second color being greater than the second luminance threshold may indicate that the second color is bright, i.e. the foreground color may be adjusted to a brighter color.

For example, the first brightness threshold is 50, the second brightness threshold is also 50. The first color is black, and the second color is white. A brightness value of black is 0, and a brightness value of white is 100. That is, the background color may be adjusted to be black, and the foreground color may be adjusted to be white, such that the rendered page of the third party application enters a dark mode.

In detail, the electronic device may make a judgement on a painting command through a hardware accelerated paint user interface (HWUI) layer and then inject a color inversing algorithm. In addition, the electronic device may process the background color and the foreground color based on a native Force Dark color inversing rule to adjust the background color into the first color and adjust the foreground color into the second color. The electronic device may adjust the background color and the foreground color from both the hardware (HWUI layer) and the software (native Force Dark color inversing rule), such that the first color and the second color may be obtained more quickly and more accurately.

The HWUI layer may substantially take the OpenGL for Embedded Systems (OpenGL ES) to perform Graphics Processing Unit (GPU) hardware drawing to improve drawing performance of the entire system.

In an operation 206, the background region of the third party application may be rendered by the first color, and the foreground region of the third party application may be rendered by the second color, such that the page of the third party application may be obtained.

Rendering may refer to a process of generating a visual view based on codes. The electronic device renders the background region of the third party application by taking the first color, i.e., the first color is colored in the background region. The electronic device renders the foreground region of the third party application by taking the second color, i.e., the second color is colored in the foreground region.

When the brightness value of the first color is less than the first brightness threshold, the rendered background region may be darker. When the brightness value of the second color is greater than the second brightness threshold, the rendered foreground region may be brighter. In this way, the obtained page of the third party application enters the dark mode.

When the page of the third application is a browser web page, rendering the first color and the second color in the web page may be performed in the kernel of the browser.

In an operation 208, the rendered page of the third party application may be displayed.

The screen of the electronic device may be an Organic Light-Emitting Diode (OLED) screen. The electronic device displays the rendered page of the third party application based on the OLED screen. When the background region in the page of the third party application is the first color, which has the brightness value less than the first brightness threshold, a region in the OLED screen corresponding to the background region provides a brightness value corresponding to the first color. The first color may be darker, and power that the OLED screen consumes to provide the brightness may be low, such that power consumption of the screen of the electronic device may be saved.

Further, when the first color is black, i.e. the background region in the page of the third party application is black, the region in the OLED screen corresponding to the background region does not need to be illuminated to show the background region in black, such that the power consumption of the screen of the electronic device may further be saved.

According to the above method of displaying the page of the third party application, when the electronic device enters the power saving mode, in response to the activation command of activating the third party application, the electronic device may obtain the background color and the foreground color in the scripts of the third party application; adjust the background color to the first color and adjust the foreground color to the second color. The brightness value of the first color is less than the first brightness threshold, the brightness value of the second color is greater than the second brightness threshold, and the first brightness threshold is less than or equal to the second brightness threshold. That is, the electronic device may darken the background color of the third party application, and brighten the foreground color of the third party application. The background region where the background color is located occupies a large amount of the area of the page of the third party application, such that the rendered page of the third party application may enter the dark mode. The electronic device may display the rendered page of the third party application, and the power consumption of the screen may be reduced.

Further, when the electronic device enters the power saving mode, the systemic applications that are inherently installed in the electronic device, such as the system desktop and the contact list, may enter the dark mode. When the electronic device activates a third party application, the electronic device may display the rendered page of the third party application, and the page also enters the dark mode. In this way, the coordination between the displayed page of the third party application and the displayed page of the systemic application may be improved.

Figure 4:
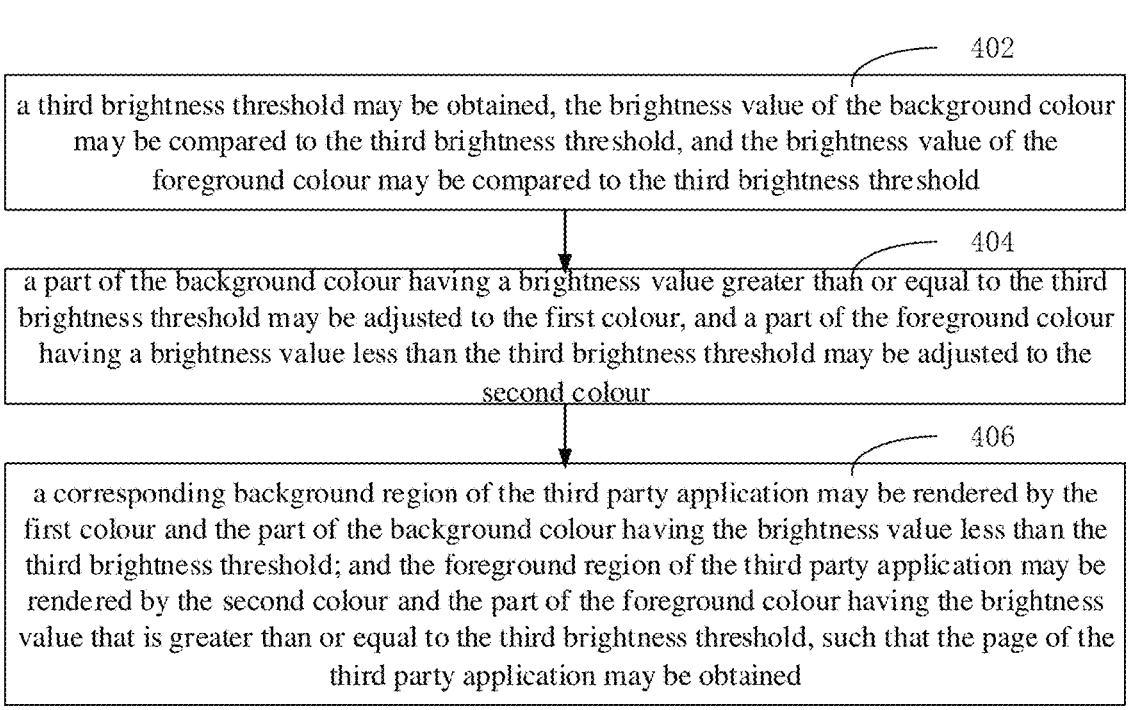
FIG. 4 is a flow chart of a method of displaying a page of a third party application according to another embodiment of the present disclosure.

In an embodiment, as shown in FIG. 4, the operation of adjusting the background color into the first color and adjusting the foreground color into the second color may include following operations.

In an operation 402, a third brightness threshold may be obtained, the brightness value of the background color may be compared to the third brightness threshold, and the brightness value of the foreground color may be compared to the third brightness threshold.

The third brightness threshold may be set based on the user's demands, for example, the third brightness threshold may be 50.

In an operation 404, a part of the background color having a brightness value greater than or equal to the third brightness threshold may be adjusted to the first color, and a part of the foreground color having a brightness value less than the third brightness threshold may be adjusted to the second color.

The electronic device may take a color having a brightness value greater than or equal to the third brightness threshold as a bright color, and take a color having a brightness value less than the third brightness threshold as a dark color.

There may be one or at least two background colors. Similarly, there may be one or at least two foreground colors. Any of the one or at least two background colors having a brightness value greater than or equal to the third brightness threshold may be adjusted to the first color, and any of the one or at least two background colors having a brightness value less than the third brightness threshold remains unchanged. The brightness value of the first color is less than the third brightness threshold. That is, any background color that belongs to bright colors may be adjusted into a dark color, and any background color that belongs to the dark colors remains unchanged.

Similarly, for all foreground colors, any of the foreground colors having a brightness value less than the third brightness threshold may be adjusted to the second color, and any of the foreground colors having a brightness value greater than or equal to the third brightness threshold remains unchanged. The brightness value of the second color is greater than or equal to the third brightness threshold. That is, any foreground color that belongs to dark colors may be adjusted into a bright color, and any foreground color that belongs to the bright colors remains unchanged.

The operation of taking the first color to render the background region of the third party application, and taking the second color to render the foreground region of the third party application, such that obtaining the page of the third party application, may include following operations.

In an operation 406, a corresponding background region of the third party application may be rendered by the first color and the part of the background color having the brightness value less than the third brightness threshold; and the foreground region of the third party application may be rendered by the second color and the part of the foreground color having the brightness value that is greater than or equal to the third brightness threshold, such that the page of the third party application may be obtained.

In the present embodiment, the part of the background color having the brightness value greater than or equal to the third brightness threshold may be adjusted into the first color; and the part of the background color having the brightness value less than the third brightness threshold remains unchanged, i.e., no adjustment is performed. The part of the foreground color having the brightness value less than the third brightness threshold may be adjusted into the second color, and the part of the foreground color having the brightness value greater than or equal to the third brightness threshold remains unchanged, i.e., no adjustment is performed. In this way, processing resources of the electronic device may be saved, and the page of the third party application may be obtained more quickly and may be displayed, and a processing efficiency of the device may be improved.

In an embodiment, the third brightness threshold may be obtained. Before comparing the brightness value of the background color and the brightness value of the foreground color to the third brightness threshold, respectively, the method further include following operations. An RGB value of the foreground color may be obtained, and obtaining an RGB value of the background color may be obtained. The RGB value of the foreground color and the RGB value of the background color may be converted into LAB values, respectively. The L channel value of the LAB value of the foreground color may be taken as the brightness value of the foreground color. The L channel value of the LAB value of the background color may be taken as the brightness value of the background color.

The RGB (red, green, blue) values may refer to three channel values of the foreground color, i.e., a red channel, a green channel and a blue channel. The three channel RGB values may be fused to obtain the foreground color.

The LAB may be a color mode and may have three channel values, a brightness channel L and two color channels A and B. The A represents a component from green to red, and the B represents a component from blue to yellow.

The electronic device obtains the RGB value of the foreground color and the RGB value of the background color, converts the RGB value of the foreground color into LAB values, and converts the RGB value of the background color into LAB values. Further, the electronic device takes the L channel value in the LAB values of the foreground color as the brightness value of the foreground color, and takes the L channel value in the LAB values of the background color as the brightness value of the background color. In this way, the brightness value of the foreground color and the brightness value of the background color may be obtained accurately.

In an embodiment, the method may further include following operations. When the electronic device is in the power saving mode, in response to the activation command of activating the third party application and the third party application having the dark mode, the electronic device may activate the dark mode of the third party application. When the electronic device is in the power saving mode, in response to the activation command of activating the third party application and the third party application not having the dark mode, the electronic device may perform the operation of obtaining the background color and the foreground color in the scripts of the third party application.

When the electronic device enters the power saving mode, in response to the activation command of activating the third party application and the third party application having the dark mode, the electronic device may activate the dark mode of the third party application. That is, the electronic device may turn on the dark mode of the third party application to adapt to the power saving mode of the electronic device, such that compatibility between the third party application and the electronic device may be improved.

When the electronic device enters the power saving mode, in response to the activation command of activating the third party application and the third party application not having the dark mode, the electronic device may perform the operation of obtaining the background color and the foreground color from the scripts of the third party application, such that the third party application may enter the dark mode, the power consumption of the screen of the electronic device may be reduced, and the coordination between the displayed page of the third party application and the displayed page of the systemic application may be improved.

In an embodiment, after obtaining the background color and the foreground color from the scripts of the third party application, the method further includes following operations. The background color and the foreground color in the scripts of the third party application may be stored. When the electronic device exits the power saving mode, the electronic device may obtain the saved background color and the foreground color in the scripts of the third party application, may render the background region of the third party application by the background color, and may render the foreground region of the third party application by the foreground color. The electronic device may update the page of the third party application and display the updated page of the third party application.

After the electronic device obtains the background color and the foreground color from the scripts of the third party application, the electronic device may save the obtained background and foreground colors in the storage medium (such as a flash memory) of the electronic device. When the electronic device exits the power saving mode, the electronic device may obtain the saved background color and the foreground color of the scripts of the third party application may be retrieved from the storage medium (such as the flash memory); render the background region of the third party application by the background color; and render the foreground region of the third party application by the foreground color. The electronic device may update the page of the third party application; display the updated page of the third party application; and restore the page of the third party application to a state before entering the power saving mode.

Figure 5:
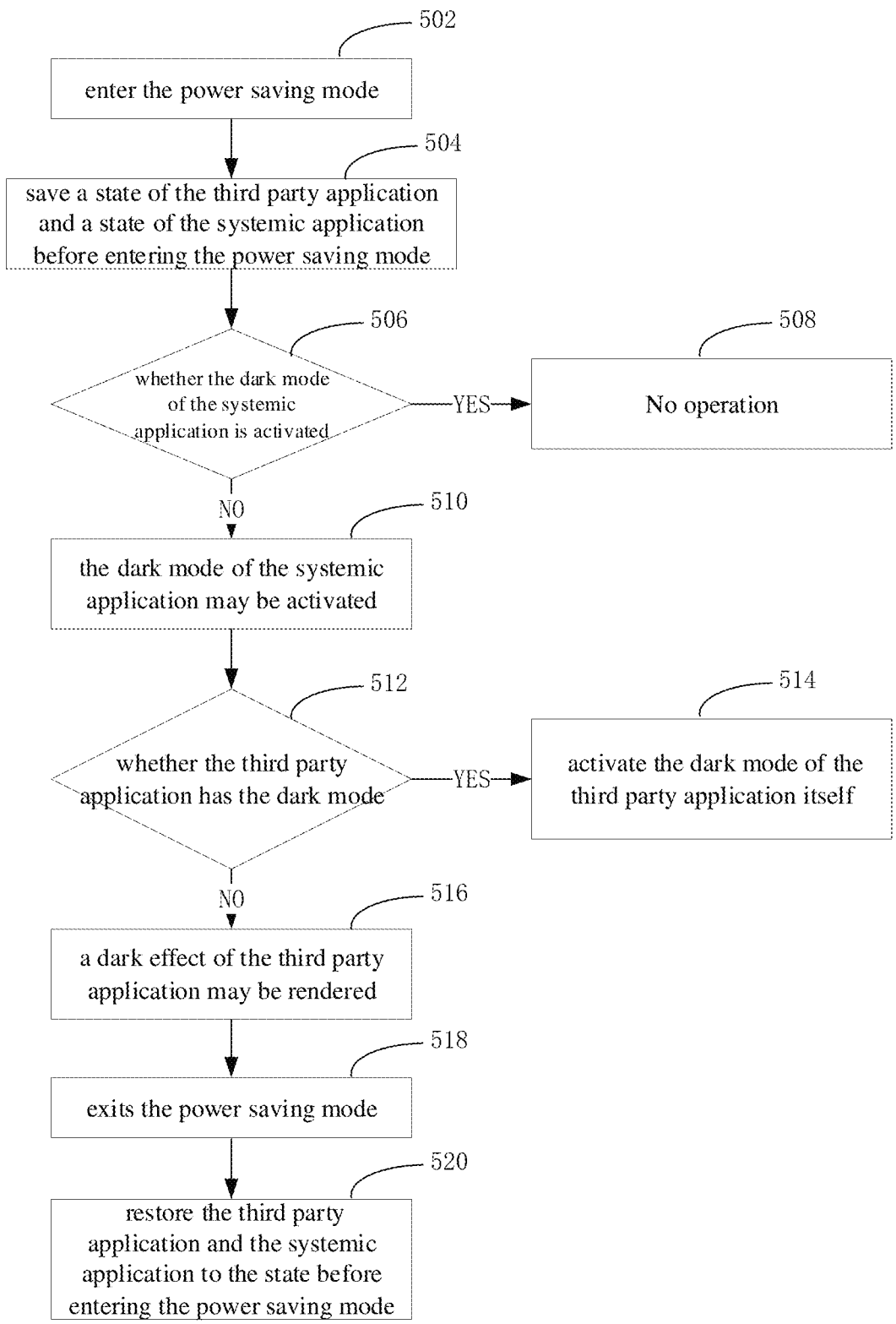
FIG. 5 is a flow chart of a method of displaying a page of a third party application according to another embodiment of the present disclosure.

In an embodiment, as shown in FIG. 5, the electronic device may perform the operation 502 to enter the power saving mode; and perform the operation 504 to save a state of the third party application and a state of the systemic application before entering the power saving mode. The electronic device may perform the operation 506 to determine whether the dark mode of the systemic application is activated. In response to the dark mode of the systemic application being determined as being activated, no operation is performed, i.e., an operation 508 is entered. In response to the dark mode of the systemic application being determined as not being activated, an operation 510 is performed. In the operation 510, the dark mode of the systemic application may be activated.

The electronic device is inherently installed with the systemic applications, such as the system desktop, the settings, the browser, the application store, the calculator, the camera, the contact list, and so on. The systemic applications may enable basic functions for the electronic device, such as displaying the system desktop, setting functions, browsing a web, downloading applications from the application store, performing calculations, capturing photos, phone calling, and so on.

The electronic device may perform an operation 512 to determine whether the third party application has the dark mode. In response to the third party application being determined as having the dark mode, an operation 514 is performed to activate the dark mode of the third party application itself. In response to the third party application being determined as not having the dark mode, an operation 516 is performed.

In the operation 516, a dark effect of the third party application may be rendered. In detail, the electronic device may obtain the background color and the foreground color in the scripts of the third party application; adjust the background color to the first color and adjust the foreground color to the second color. The brightness value of the first color is less than the first brightness threshold, the brightness value of the second color is greater than the second brightness threshold, and the first brightness threshold is less than or equal to the second brightness threshold. The electronic device may render the background region of the third party application by the first color and render the foreground region of the third party application by the second color, such that the electronic device may obtain the page of the third party application and display the rendered page of the third party application.

When the electronic device performs the operation 518 and exits the power saving mode, the electronic device may perform an operation 520 to restore the third party application and the systemic application to the state before entering the power saving mode.

Figure 6:
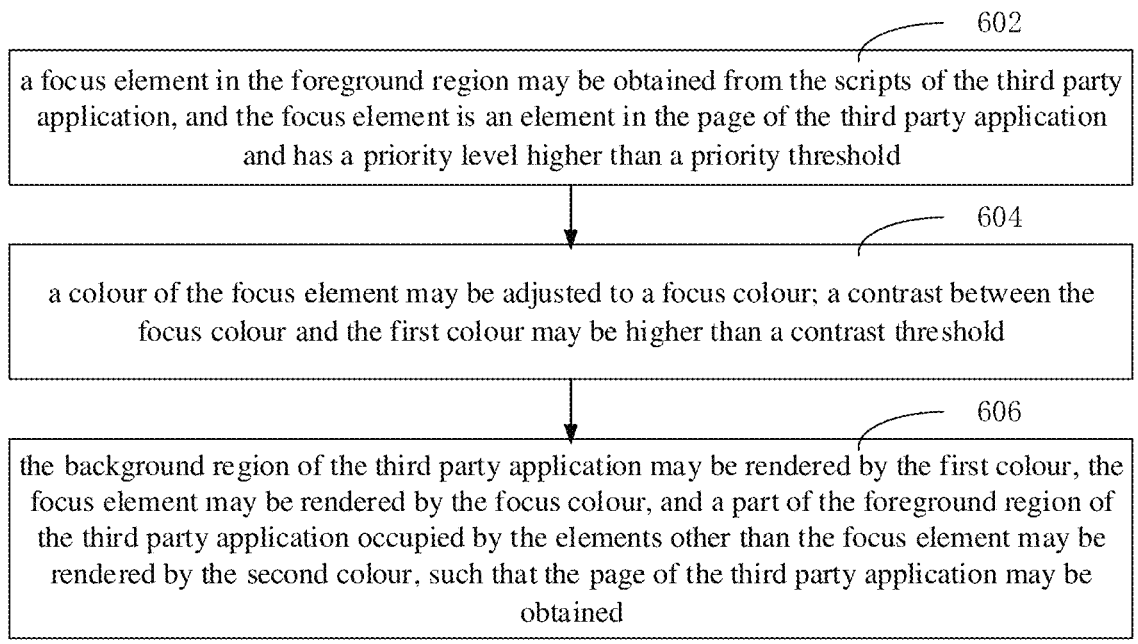
FIG. 6 is a flow chart of a method of displaying a page of a third party application according to another embodiment of the present disclosure.

In an embodiment, as shown in FIG. 6, the above method may further include following operations.

In an operation 602, a focus element in the foreground region may be obtained from the scripts of the third party application, and the focus element is an element in the page of the third party application and has a priority level higher than a priority threshold.

The foreground region may include various elements, such as texts, the icon, the photograph, the video, the audio, and so on. The various elements in the foreground region may have different importance levels. A corresponding priority level may be set for each of the various elements based on the importance level of each of the various elements in the foreground region. The higher the priority level, the more important the element is.

For example, the foreground region may include the navigation bar, chatting information of contacts, a volume control, an image capturing control, and so on. The volume control and the image capturing control are functional controls frequently used by the user. Therefore, a priority level of the volume control and a priority level of the image capturing control may be set to be level four, a priority level of the navigation bar may be set to be level two, a priority level of the chatting information of contacts may be set to be level three, and the priority threshold may be level three. Therefore, the volume control and the image capturing control may be focus elements In an operation 604, a color of the focus element may be adjusted to a focus color; a contrast between the focus color and the first color may be higher than a contrast threshold.

The contrast between the focus color and the first color refers to measurement of the different brightness levels between the focus color and the first color. A larger difference range may represent a greater contrast, and a smaller difference range may represent a smaller contrast.

The first color may be the color of the background region, and the focus color may be the color of the focus element in the foreground region. The contrast between the focus color and the first color may be higher than the contrast threshold, such that the focus element may be highlighted more from the color of the background region and may be shown more clearly.

In an embodiment, the first color is black, the second color is white, and the focus color is blue, i.e., the color of the background region is black, the region occupied by the elements other than the focus element is white, and the focus element is blue. In this way, the focus element may be highlighted more and shown more clearly.

The operation of taking the first color to render the background region of the third party application, and taking the second color to render the foreground region of the third party application, such that obtaining the page of the third party application, may include following operations.

In an operation 606, the background region of the third party application may be rendered by the first color, the focus element may be rendered by the focus color, and a part of the foreground region of the third party application occupied by the elements other than the focus element may be rendered by the second color, such that the page of the third party application may be obtained.

In the present embodiment, the focus element may be obtained from the foreground region and the color of the focus element may be adjusted to the focus color. The contrast between the focus color and the first color of the background region is higher than the contrast threshold. In this way, while the page of the third-party application is being displayed, the focus element may be more prominently and more clearly shown. Based on a borderless concept, the 24-hour dark mode differentiates page hierarchies, the contrast in the dark mode may be improved effectively, reducing a possibility of visual fatigue. Pages of the third-party application may be fully adapted when the system is optimized, such that a situation that interface elements may be difficult to be seen or a situation of visual conflicts may not occur. The 24-hour dark mode may satisfy any application scenario and may be applicable at any time of the day or night, from an eye-catching high light ratio situation to a comfortable low contrast situation. In addition, an intelligent brightness adjustment function may be configured to allow the dark mode to function in both a bright scenario and a dark scenario. Therefore, even activating the dark mode in daylight hours, a reading experience may not be compromised.

Figure 7:
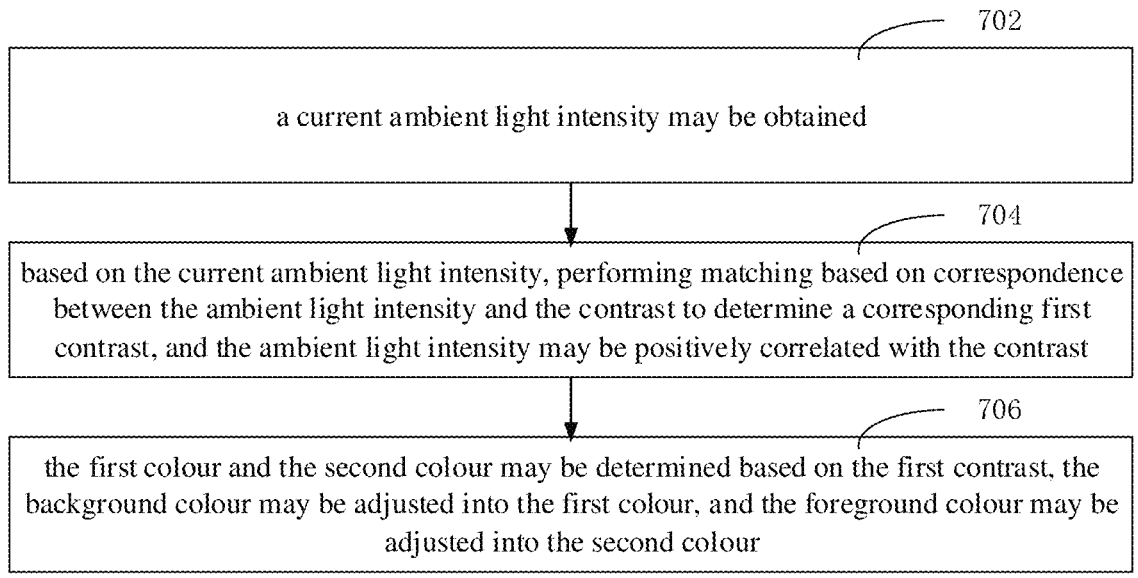
FIG. 7 is a flow chart of obtaining a first color and a second color based on an ambient light intensity according to an embodiment of the present disclosure.

In an embodiment, as shown in FIG. 7, the operation of adjusting the background color into the first color and adjusting the foreground color into the second color may include the following operations.

In an operate 702, a current ambient light intensity may be obtained.

The ambient light intensity refers to brightness of an environment where the electronic device is located.

In an operation 704, based on the current ambient light intensity, performing matching based on correspondence between the ambient light intensity and the contrast to determine a corresponding first contrast, and the ambient light intensity may be positively correlated with the contrast.

The electronic device may preset the correspondence between the ambient light intensity and the contrast. The first contrast refers to the contrast between the first color and the second color. The ambient light intensity may be positively correlated with the contrast, and that is, the larger the value of the ambient light intensity, the larger the value of the contrast, and the less the value of the ambient light intensity, the less the value of the contrast. The contrast in the correspondence between the ambient light intensity and the contrast may be determined based on the user's demands, such as determined as a maximum background brightness, a minimum background brightness for dialogs/floating layers, a minimum foreground brightness.

When the value of the current ambient light intensity is large, the ambient light intensity is high, and human eyes may not be sensitive to brightness of the screen of the electronic device. The user may not easily see the content in the display interface clearly. In this case, the first contrast may be determined to be high to allow the user to see the content in the page clearly. When the value of the current ambient light intensity is small, the ambient light intensity is low, and human eyes may be sensitive to brightness of the screen of the electronic device. In this case, the first contrast may be determined to be relatively low.

In an operation 706, the first color and the second color may be determined based on the first contrast, the background color may be adjusted into the first color, and the foreground color may be adjusted into the second color.

In an embodiment, the electronic device may determine the first color to be black, and subsequently, determine the second color based on the first contrast. In another embodiment, the electronic device may determine the second color to be white, and subsequently determine the first color based on the first contrast. In other embodiments, the electronic device may determine a plurality of combinations of the first color and the second color based on the first contrast, and select one combination from the plurality of combinations.

In the present embodiment, the current ambient light intensity may be obtained, and the first contrast may be determined based on the current ambient light intensity, such that the first color and the second color may be determined. In this way, the page of the third party application may be combined with the current ambient light intensity, such that the page of the third party application may be displayed more accurately.

Figure 8:
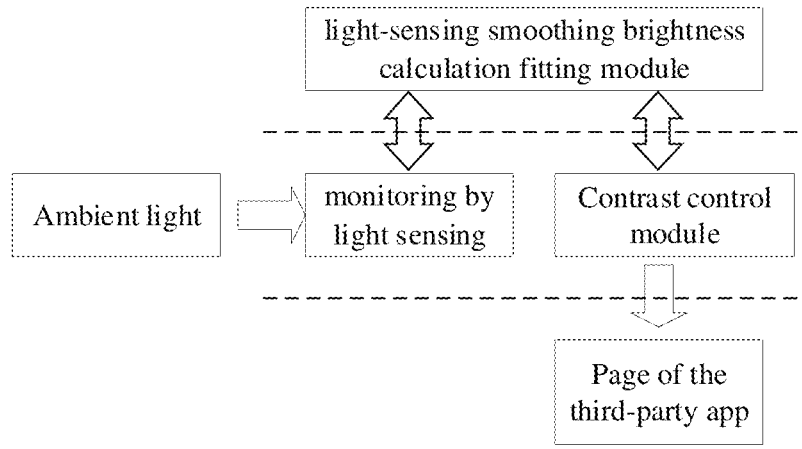
FIG. 8 is an architectural diagram of displaying a page of a third party application based on an ambient light intensity according to an embodiment of the present disclosure.

In an embodiment, as shown in FIG. 8, a light-sensing smoothing brightness calculation fitting module in the electronic device may monitor the ambient light through light sensing, obtain the current ambient light intensity may be obtained, and send the current ambient light intensity to a contrast control module. The contrast control module performs the matching based on the correspondence between the ambient light intensity and the contrast based on the current ambient light intensity and determines a corresponding first contrast. The ambient light intensity is positively correlated with the contrast. The electronic device determines the first color and the second color based on the first contrast; adjusts the background color into the first color and adjusts the foreground color into the second color; and renders the background region of the third party application by taking the first color and renders the foreground region of the third party application by taking the second color to obtain the page of the third party application.

In an embodiment, after displaying the rendered page of the third party application, the method further includes the following operations. When a change in the current ambient light intensity is detected, the matching based on the correspondence between the ambient light intensity and the contrast may be performed based on the new ambient light intensity to determine a new first contrast. A new first color and a new second color may be determined based on the new first contrast. The background region of the third party application may be rendered by the new first color and the foreground region of the third party application may be rendered by the new second color. The page of the third party application may be updated, and the updated page of the third party application may be displayed.

When the change in the current ambient light intensity is detected, the electronic device determines the new first contrast based on the new ambient light intensity to determine the new first color and the new second color; renders the background region of the third party application by taking the new first color and renders the foreground region of the third party application by taking the new second color; and displays a new page of the third party application, and updates the page of the third party application.

In the present embodiment, the electronic device detects whether the current ambient light intensity is changed. When the electronic device detects that the current ambient light intensity is changed, the electronic device determines the new first color and the new second color and displays the updated third party application. In this way, the page of the third party application may be displayed in real-time and more accurately.

In an embodiment, after the electronic device enters the power saving mode, the method further includes following operations. In response to the activation command of activating the systemic application in the electronic device, the electronic device may obtain the foreground color and the background color in the scripts of the systemic application;

adjust the foreground color of the systemic application into a third color and adjust the background color of the systemic application into a fourth color. A brightness value of the third color is less than a fourth brightness threshold, a brightness value of the fourth color is greater than a fifth brightness threshold, the fourth brightness threshold is less than or equal to the fifth brightness threshold. The electronic device may render the background region of the systemic application by taking the third color and render the foreground region of the systemic application by taking the fourth color to obtain a page of the systemic application; and display the rendered page of the systemic application.

The electronic device is inherently installed with the systemic applications, such as the system desktop, the settings, the browser, the application store, the calculator, the camera, the contact list, and so on. The systemic applications may enable basic functions for the electronic device, such as displaying the system desktop, setting functions, browsing a web, downloading applications from the application store, performing calculations, capturing photos, phone calling, and so on.

The fourth brightness threshold and the fifth brightness threshold may be set based on the user's demands. The electronic device may preset the third color and the fourth color.

When the brightness value of the third color is less than the fourth brightness threshold, the third color may be darker, i.e., the background color of the systemic application may be adjusted to a darker color. When the fourth color with a brightness value greater than the fifth brightness threshold, the fourth color may be brighter, i.e., the foreground color of the systemic application may be adjusted to a brighter color.

For example, the fourth brightness threshold is 50, the fifth brightness threshold is also 50, the third color is black, the fourth color is white, a brightness value of black is 0 and a luminance value of white is 100. That is, the background color of the systemic application may be adjusted to be black, and the foreground color of the systemic application may be adjusted to be white. In this way, the rendered page of the systemic application enters the dark mode.

In the present embodiment, when the electronic device enters the power saving mode, in response to the activation command activating the systemic application, the electronic device may render the systemic application to obtain the page of the systemic application in the dark mode. In this way, when the electronic device enters the power saving mode, and when the third party application and the systemic application are being switched, the coordination between the displayed page of the third party application and the interface of the systemic application may be improved. A problem of uncoordinated pages, which is caused by one of the third party application and the systemic application being in the normal displaying mode and the other being in the dark mode (i.e., one is displayed brighter and the other is displayed darker), may be avoided. The normal displaying mode refers to a mode that the background region is brighter and the elements in the foreground region are darker.

Figure 9:
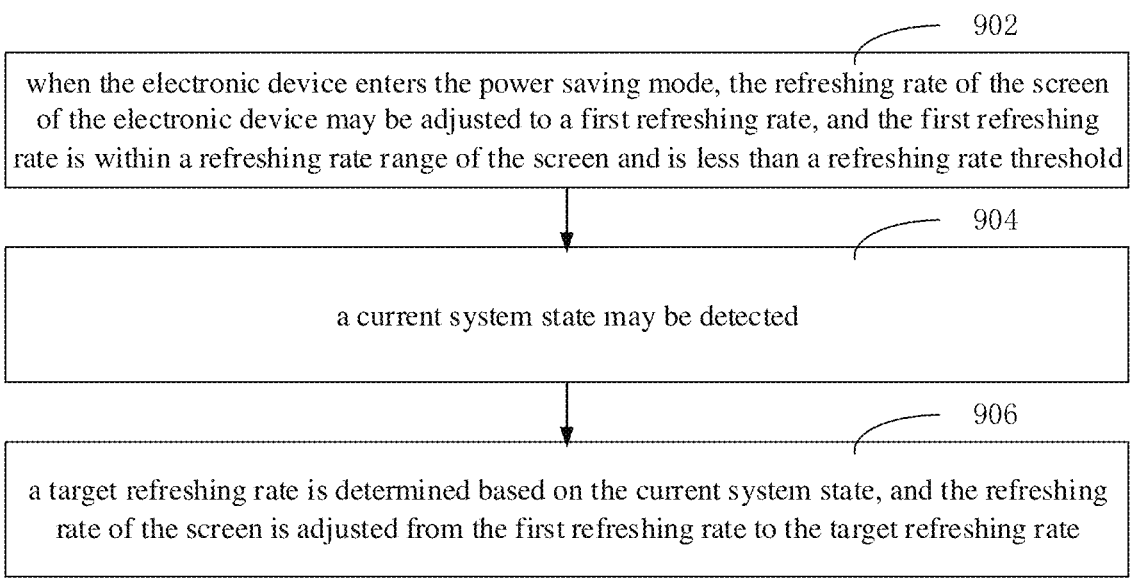
FIG. 9 is a flow chart of a method of adjusting a refreshing rate of a screen according to an embodiment of the present disclosure.

In an embodiment, as shown in FIG. 9, the method may further include following operations.

In an operation 902, when the electronic device enters the power saving mode, the refreshing rate of the screen of the electronic device may be adjusted to a first refreshing rate, and the first refreshing rate is within a refreshing rate range of the screen and is less than a refreshing rate threshold.

The refreshing rate is the number of times that an electron beam repeatedly scans over an image on the screen. The higher the refreshing rate, the more stability that the image (displayed content) is displayed on the screen. For example, the refreshing rate of the screen may be 60 HZ, 90 HZ, 120 HZ, 144 HZ. An image displayed on a screen having the refreshing rate of 120 HZ may be more stable than an image displayed on a screen having the refreshing rate of 60 HZ.

It shall be understood that, in order to not allow the human eyes to realize that the screen is refreshing (being scanned), the refreshing rate of the screen needs to be greater than or equal to a lower limit. In order to enable the battery of the electronic device to run longer, the refreshing rate of the screen needs to be less than or equal to an upper limit. A range between the upper limit and the lower limit is a range of refreshing rates of the screen. The upper limit and the lower limit may be determined practically.

The first refreshing rate is within the range of refreshing rates of the screen. In this situation, when the refreshing rate of the screen of the electronic device is adjusted to the first refreshing rate, the screen may operate normally. The first refreshing rate is less than a refreshing rate threshold, a maximum value of the first refreshing rate may be limited, such that the power consumption of the screen may be reduced. The first refreshing rate may also be at a specific level, such as any one of: 60 HZ, 90 HZ, 120 HZ, and 144 HZ.

In an embodiment, the first refreshing rate may be the lower limit of the range of refreshing rates of the screen, i.e., a minimal value in the range of refreshing rates, such that the power consumption of the screen may be saved optimally.

The refreshing rate threshold may be determined based on the demands. Further, the electronic device obtains a refreshing rate before entering the power saving mode and sets the refreshing rate threshold to be less than the refreshing rate before entering the power saving mode. After the electronic device enters the power saving mode, the electronic device adjusts the refreshing rate of the screen to the first refreshing rate. The first refreshing rate is less than the refreshing rate threshold, and the refreshing rate threshold is less than the refreshing rate before entering the power saving mode. Therefore, the first refreshing rate after entering the power saving mode is less than the refreshing rate before entering the power saving mode, such that the refreshing rate of the screen may be reduced, and the power consumption of the screen may be saved.

In an operation 904, a current system state may be detected.

The current system state refers to a current state of the system of the electronic device. The current system state may be one of: a gaming state, a video playing state, an application switching state, an animation playing state, a state of running a specific application, a social chatting state, a music playing state, and so on.

The current system state may be a state that requires a high refreshing rate, such as one of: the gaming state, the video playing state, the application switching state, the animation playing state and the state of running a specific application. Alternatively, the current system state may be a state that does not require the high refreshing rate, such as one of: the social chatting state and the music playing state. Various current system states may correspond to various refreshing rates.

In an embodiment, the electronic device detects the current system state by performing at least one of a polling reading mechanism and registering callback monitoring.

In another embodiment, the electronic device detects an application in a current display interface of the screen and all elements in the display interface. The electronic device determines the current system state based on the application and the elements in the current display interface of the screen.

The application in the current display interface of the screen refers to an application that is currently in the display interface. For example, when the user is using the application WeChat, the WeChat is the application in the current display interface. When the user is using the WeChat and running a lyrics floating window function of a music playing application, the lyrics of a song may be displayed in the display interface, both the WeChat and the music playing application are applications in the current display interface.

The number of applications in the current display interface may be one or more. The application that is currently in use may be an application that is inherently installed in the system of the electronic device, such as a camera application, a music playing application, a photo gallery application, and so on. Alternatively, the application that is currently in use may be may be an application downloaded by the user, such as the WeChat application, an Alipay application, and so on.

Elements in the display interface of the screen may include images, videos, audios, texts, and may further include the brightness of the screen, a size of the screen, and so on.

For example, when the application that is currently in use is the WeChat, and when the display interface includes a video, the current system state may be determined as the video playing state. In another example, when the application that is currently in use is a game, and when the display interface includes gaming elements, such as turrets and enemy minions, the current system state may be determined as the gaming state. In another example, the application that is currently in use includes the WeChat. When the WeChat is running on the foreground, and when elements in the display interface include texts and images, the current system state may be determined as the social chatting state.

In an operation 906, a target refreshing rate is determined based on the current system state, and the refreshing rate of the screen is adjusted from the first refreshing rate to the target refreshing rate.

Various current system states may correspond to various refreshing rates, and therefore, target refreshing rates determined based on the current system states may also be various.

For example, when the current system state requires the high refreshing rate, such as being in the gaming state, the video playing state, the application switching state, the animation playing state or the state of running a specified application, a relatively high target refreshing rate may be determined. When the current system state does not require the high refreshing rate, such as being in the social chatting state and the music playing state, a relatively low target refreshing rate may be determined.

The electronic device may preset correspondence between each system state and each refreshing rate and obtain the correspondence between the system state and the refreshing rate; match the correspondence between the system state and the refreshing rate with the current system state, determine a refreshing rate of the current system state from the correspondence between the system state and the refreshing rate; and take the determined refreshing rate as the target refreshing rate.

For example, when the current system state is the gaming state, a refreshing rate of the gaming state is determined to be 90 HZ from the correspondence between the system state and the refreshing rate, i.e., the target refreshing rate is 90 HZ. When the current system state is the music playing state, the refreshing rate of the music playing state is determined to be 60 HZ from the correspondence between the system state and the refreshing rate, i.e., the target refreshing rate is 60 HZ.

In the present embodiment, when the electronic device enters the power saving mode, the electronic device adjusts the background color and the foreground color of the page of the third party application to enable the displayed page of the third party application to be in the dark mode, such that the power consumption of the screen of the electronic device may be saved. When the electronic device enters the power saving mode, the refreshing rate of the screen of the electronic device may be adjusted to be the first refreshing rate. In this way, the power consumption of the screen of the electronic device may be reduced, and the power of the electronic device may be saved. The electronic device detects the current system state; determines the target refreshing rate based on the current system state; adjusts the refreshing rate of the screen from the first refreshing rate to the target refreshing rate, such that the refreshing rate of the screen may match with the current system state, and the adjusted refreshing rate of the screen may be determined more accurately.

Further, when the electronic device enters the power saving mode, the power consumption may be optimized. That is, the power consumption of the screen of the electronic device may be reduced. The electronic device determines the target refreshing rate based on the current system state, and adjusts the refreshing rate of the screen from the first refreshing rate to the target refreshing rate. In this way, a display effect and user experience of the display interface in the current system state may be ensured, and a balance between the power consumption and the user experience may be achieved.

In an embodiment, after adjusting the refreshing rate of the screen from the first refreshing rate to the target refreshing rate, the method further includes following operations. When the electronic device exits the power saving mode a second refreshing rate is obtained. The second refreshing rate is higher than or equal to the first refreshing rate. The electronic device adjusts the refreshing rate of the screen from the target refreshing rate to the second refreshing rate.

When the electronic device exits the power saving mode, the electronic device enters the normal displaying mode. In the normal displaying mode, in order to ensure the display interface to display contents more clearly, more smoothly and more accurately, the obtained second refreshing rate is higher than or equal to the first refreshing rate, and the electronic device adjusts the screen refreshing rate from the target refreshing rate to the second refreshing rate.

Further, before the electronic device enters power saving mode, the method further includes following operations. The electronic device obtains a current original refreshing rate of the screen. The operation of obtaining the refreshing refresh rate when the electronic device exits the power saving mode may include following operations. When the electronic device exits the power saving mode, the electronic device obtains the original refreshing rate. The operation of adjusting the refreshing rate of the screen from the target refreshing rate to the second refreshing rate may include following operations. The electronic device restores the refreshing rate of the screen from the target refreshing rate to the original refreshing rate.

Before the electronic device enters the power saving mode, the electronic device obtains the current original refreshing rate of the screen, i.e., the refreshing rate of the screen when the electronic device is in the normal displaying mode. The electronic device saves the refreshing rate to the storage medium of the electronic device (such as the flash memory). When the electronic device exits the power saving mode, the electronic device retrieves the original refreshing rate from the storage medium and adjusts the screen refreshing rate from the target refreshing rate to the second refreshing rate. That is, the refreshing rate of the screen is restored to the refreshing rate before the electronic device enters the power saving mode.

In an embodiment, the current system state includes a first system state or a second system state. A refreshing rate required by the first system state may be higher than a refreshing rate required by the second system state. The operation of determining the target refreshing rate based on the current system state and adjusting the refreshing rate of the screen from the first refreshing rate to the target refreshing rate, may include following operations. When the current system state is the first system state, the electronic device obtains a first reference refreshing rate corresponding to the first system state and adjusts the refreshing rate of the screen from the first refreshing rate to the first reference refreshing rate. When the current system state is the second system state, the electronic device obtains a second reference refreshing rate corresponding to the second system state and adjusts the refreshing rate of the screen from the first refreshing rate to the second reference refreshing rate. The first reference refreshing rate is higher than the second reference refreshing rate.

The first system state is one of: the gaming state, the video playing state, the application switching state, the animation playing state and the state of running a specified application. The second system state is the social chatting state or the music playing state. The specified application may be an application that is set by the user to require a high refreshing rate, such as Weibo, WeChat, and so on. Alternatively, the specified application may be an application that supports the high refreshing rate. When the specified application is running, a page of the specified application is displayed on the display interface of the screen, and the screen is refreshed based on the first reference refreshing rate. In this way, a clearer page of the specified application may be obtained. The first system state requires a better visual effect, and the second system state requires may not have specific requirements for the visual effect. That is, the refreshing rate required by the first system state may be higher than the refreshing rate required by the second system state.

When the current system state is the first system state, the refreshing rate of the screen corresponding to the first system state may be the first reference refreshing rate. When the current system state is the second system state, the refreshing rate of the screen corresponding to the second system state may be the second reference refreshing rate. Since the refreshing rate required by the first system state is higher than the refreshing rate required by the second system state, the first reference refreshing rate may be higher than the second reference refreshing rate.

In the present embodiment, the current system state includes the first system state or the second system state. When the current system state is the first system state, the corresponding first reference refreshing rate may be obtained. When the current system state is the second system state, the corresponding second reference refreshing rate may be obtained. The refreshing rate required by the first system state is higher than the refreshing rate required by the second system state. Therefore, the first reference refreshing rate may be higher than the second reference refreshing rate, and the refreshing rate of the screen may be adjusted more accurately.

In an embodiment, the above method further includes following operations. A second contrast between the first color and the second color is determined based on the first color and the second color. Matching may be performed on the correspondence between the refreshing rate and the contrast based on the second contrast, such that the corresponding second refreshing rate is determined. The refreshing rate may be negatively correlated with the contrast. The refreshing rate of the screen is adjusted to the second refreshing rate.

The second contrast refers to measurement of different brightness levels between the first color and the second color. A larger range of the difference may represent a higher second contrast, and a smaller range of the difference may represent a lower second contrast.

The electronic device may preset the correspond between the refreshing rate and the contrast. The refreshing rate may be negatively correlated with the contrast. That is, the higher the value of the refreshing rate, the lower the value of the contrast; and the lower the value of refreshing rate, the higher the value of the contrast.

When the second contrast is large, the user may easily obtain contents from the displayed page of the third party application. Therefore, a relatively low second refreshing rate may be determined, such that the power consumption of the screen may be reduced.

When the second contrast is low, the user may not easily obtain the contents from the displayed page of the third party application. Therefore, a relatively large second refreshing rate may be determined, such that the page of the third party application may be displayed more clearly, and the user may obtain the contents of the third party application from the display interface of the screen more easily.

It shall be understood that although the operations in the flow charts of FIGS. 2, 4, 6, 7 and 9 are shown in an order indicated by arrows, the operations are not necessarily performed in the order indicated by the arrows. Unless expressly stated herein, a sequence of performing these operations are strictly limited by the present disclosure. The operations may be performed in any other sequence. Furthermore, at least some of the operations in FIGS. 2, 4, 6, 7 and 9 may include a plurality of sub-operations or a plurality of stages. The plurality of sub-operations or the plurality of stages may not be necessarily performed at a same time point, but may be performed at different time points. The sub-operations or stages may not be necessarily sequentially performed. The sub-operations or stages of one operation may be performed alternately with another operation or with sub-operations or stages of another operation.

Figure 10:
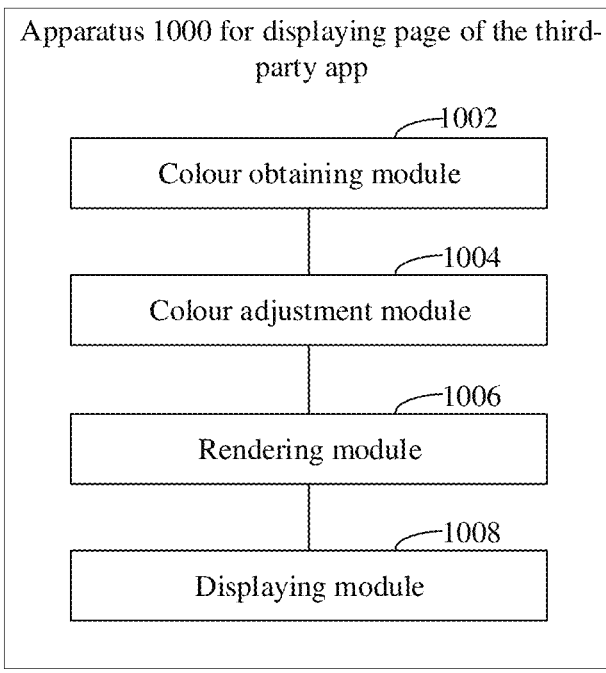
FIG. 10 is a structural schematic view of an apparatus of displaying a page of a third party application according to an embodiment of the present disclosure.

FIG. 10 is a structural schematic view of an apparatus of displaying a page of a third party application according to an embodiment of the present disclosure. As shown in FIG. 10, an apparatus 1000 for displaying a page of a third party application is provided. The apparatus 1000 may include a color obtaining module 1002, a color adjustment module 1004, a rendering module 1006 and a displaying module 1008.

The color obtaining module 1002 is configured to obtain the background color and the foreground color in the scripts of the third party application in response to the activation command of activating the third party application and in response to the electronic device entering the power saving mode.

The color adjustment module 1004 is configured to adjust the background color to the first color and adjust the foreground color to the second color. The brightness value of the first color is less than the first brightness threshold, the brightness value of the second color is greater than the second brightness threshold, and the first brightness threshold is less than or equal to the second brightness threshold.

The rendering module 1006 is configured to render the background region of the third party application in the first color and render the foreground region of the third party application in the second color, to obtain the page of the third party application.

The displaying module 1008 is configured to display the rendered page of the third party application.

For the-above mentioned apparatus for displaying the page of the third party application, when the electronic device enters the power saving mode, in response to the activation command of activating the third party application, the apparatus obtains the background color and the foreground color in the scripts of the third party application; adjusts the background color to the first color and adjusts the foreground color to the second color. The brightness value of the first color is less than the first brightness threshold, the brightness value of the second color is greater than the second brightness threshold, and the first brightness threshold is less than or equal to the second brightness threshold. That is, the background color of the third party application is darkened, and the foreground color of the third party application is brightened. The region where the background color is located occupies a large area of the page of the third party application, such that the rendered page of the third party application enters the dark mode. The rendered page of the third party application is displayed, and the power consumption of the screen is reduced.

Further, when the electronic device enters the power saving mode, the system applications that are inherently installed in the electronic device, such as the system desktop and the contact list, also enter the dark mode. When the electronic device activates a third party application, the rendered page of the third party application is displayed, and the page is in the dark mode. In this way, the coordination between the displayed page of the third party application and the displayed page of the systemic application may be improved.

In an embodiment, the above color adjustment module 1004 is further configured to obtain the third brightness threshold, compare the brightness value of the background color to the third brightness threshold, compare the brightness value of the foreground color to the third brightness threshold; adjust the part of the background color having the brightness value greater than or equal to the third brightness threshold to the first color, and adjust the part of the foreground color having the brightness value less than the third brightness threshold to the second color. The above rendering module 1006 is further configured to render the corresponding background region of the third party application by taking the first color and the part of the background color having the brightness value less than the third brightness threshold; and to the foreground region of the third party application by taking the second color and the part of the background color having the brightness value greater than or equal to the third brightness threshold, such that the page of the third party application is obtained.

In an embodiment, the above-mentioned apparatus of displaying the page of the third party application may further include a brightness value obtaining module, configured to obtain the RGB value of the foreground color and the RGB value of the background color; convert the RGB value of the foreground color and the RGB value of the background color into LAB values; take the L channel value in the LAB value of the foreground color as the brightness value of the foreground color and take the L channel value in the LAB value of the background color as the brightness value of the background color.

In an embodiment, the above-mentioned apparatus of displaying the page of the third party application may further include a dark mode activation module for the third party application. The dark mode activation module is configured to turn on the dark mode of the third party application, in response to the activation command of activating the third party application, in response to the electronic device being in the power saving mode, and in response to the third party application having the dark mode. The above-mentioned color obtaining module 1002 is further configured to perform the operation of obtaining the background color and the foreground color in the scripts of the third party application, in response to the activation command of activating the third party application, in response to the electronic device being in the power saving mode, and in response to the third party application not having the dark mode.

In an embodiment, the above-mentioned apparatus of displaying the page of the third party application may further include a storage module, configured to store the background color and the foreground color in the scripts of the third party application. The above color obtaining module 1002 is further configured to obtain the stored background color and the foreground color in the scripts of the third party application when the electronic device exits the power saving mode. The above rendering module 1006 is further configured to render the background region of the third party application by taking the background color and render the foreground region of the third party application by taking the foreground color, and update the page of the third party application. The above displaying module 1008 is further configured to display the updated page of the third party application.

In an embodiment, the above-mentioned apparatus of displaying the page of the third party application may further include a focus color obtaining module, configured to obtain the focus element in the foreground region from the scripts of the third party application. The focus element is an element in the page of the third party application and has the priority level higher than the priority threshold. The focus color obtaining module is configured to adjust the color of the focus element to the focus color. The contrast between the focus color and the first color is higher than a contrast threshold. The above-mentioned rendering module 1006 is further configured to render the background region of the third party application by taking the first color; render the focus element by taking the focus color; and render the part of the foreground region of the third party application that is occupied by any element other than the focus element, by taking the second color, such that the page of the third party application is obtained.

In an embodiment, the first color is black, the second color is white, and focus color is blue.

In an embodiment, the above color adjustment module 1004 is further configured to obtain the current ambient light intensity; perform matching from the correspondence between the ambient light intensity and the contrast based on the current ambient light intensity to determine the corresponding first contrast. The ambient light intensity is positively correlated with the contrast. The color adjustment module 1004 is further configured to determine the first color and the second color based on the first contrast; adjust the background color to the first color and adjust the foreground color to the second color.

In an embodiment, the above color obtaining module 1002 is further configured to, in response to a change in the current ambient light intensity being detected, perform matching from the correspondence between the ambient light intensity and the contrast, based on the new ambient light intensity, to determine the new first contrast; and configured to determine the new first color and the new second color based on the new first contrast. The above rendering module 1006 is further configured to render the background region of the third party application by taking the new first color and render the foreground region of the third party application by taking the new second color, to update the page of the third party application. The above displaying module 1008 is further configured to display the updated page of the third party application.

In an embodiment, the above color obtaining module 1002 is further configured to obtain the foreground color and the background color in the scripts of the system application in response to the activation command of activating the systemic application in the electronic device. The above color adjustment module 1004 is further configured to adjust the foreground color of the systemic application to the third color and adjust the background color of the systemic application to the fourth color. The brightness value of the third color is less than the fourth brightness threshold, the brightness value of the fourth color is greater than the fifth brightness threshold, and the fourth brightness threshold is less than or equal to the fifth brightness threshold. The above rendering module 1006 is further configured to render the background region of the systemic application by taking the third color and render the foreground region of the systemic application by taking the fourth color, to obtain the page of the systemic application. The above displaying module 1008 is further configured to display the rendered page of the systemic application.

In an embodiment, the above-mentioned apparatus of displaying the page of the third party application may further include a refreshing rate adjustment module, configured to adjust the refreshing rate of the screen of the electronic device to the first refreshing rate when the electronic device enters the power saving mode. The first refreshing rate is within a range of refreshing rates of the screen and is less than the refreshing rate threshold. The refreshing rate adjustment module is further configured to: detect the current system state; and determine the target refreshing rate based on the current system state and adjust the refreshing rate of the screen from the first refreshing rate to the target refreshing rate.

In an embodiment, the current system state includes the first system state or the second system state. The refreshing rate required by the first system state is higher than the refreshing rate required by the second system state. The above refreshing rate adjustment module is further configured to obtain the first reference refreshing rate corresponding to the first system state when the current system state is the first system state, and adjust the refreshing rate of the screen from the first refreshing rate to the first reference refreshing rate; obtain the second reference refreshing rate corresponding to the second system state when the current system state is the second system state, and adjust the refreshing rate of the screen from the first refreshing rate to the second reference refreshing rate. The first reference refreshing rate is higher than the second reference refreshing rate.

In an embodiment, the above refreshing rate adjustment module is further configured to determine the second contrast between the first color and the second color based on the first color and the second color; to determine the corresponding second refreshing rate based on the second contrast by matching the correspondence between the refreshing rate and the contrast. The refreshing rate is negatively correlated with the contrast. The refreshing rate adjustment module is further configured to adjust the refreshing rate of the screen to the second refreshing rate.

The modules in the above-mentioned apparatus of displaying the page of the third party application is described for illustrative purposes only. In other embodiments, the apparatus of displaying the page of the third party application may include different modules as required to perform all or part of the functions of the above-mentioned apparatus of displaying the page of the third party application.

Details of the apparatus of displaying the page of the third party application may be referred to the description of the method of displaying the page of the third party application in the above embodiments, and will not be repeated here. The modules in the above-mentioned apparatus of displaying the page of the third party application may be implemented as a whole or in part by software, hardware and combinations thereof. The modules may be embedded in hardware or configured separately in a processor of a computing device. Alternatively, the module may be configured as software stored in the memory of the computing device, such that the processor may invoke the modules to perform the operations corresponding to each of the above modules.

Figure 11:
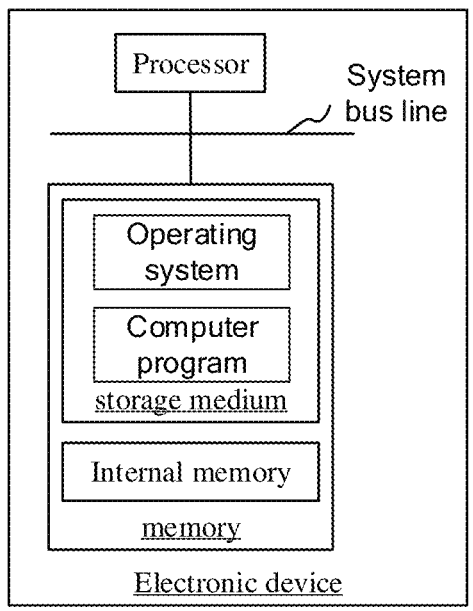
FIG. 11 is a structural schematic view of an interior of an electronic device according to an embodiment of the present disclosure.

FIG. 11 is a structural schematic view of an interior of an electronic device according to an embodiment of the present disclosure. As shown in FIG. 11, the electronic device may include a processor and a memory connected to the process via a system bus line. The processor is configured to provide computing and controlling functions to support the entire electronic device to operate. The memory may include a non-volatile storage medium and an internal memory. The non-volatile storage medium stores an operating system and a computer program. The computer program may be executed by the processor to implement the method of displaying the page of the third party application as provided in the embodiments. The internal memory provides a cached operating environment for the computer program in operating system in the non-volatile storage medium. The electronic device may be any terminal device, such as a mobile phone, a tablet computer, a Personal Digital Assistant (PDA), a Point of Sales (POS), a vehicle-mounted computer, a wearable device, and so on.

The modules in the apparatus of displaying the page of the third party application provided in the embodiments may be implemented in the form of a computer program. The computer program may run on a terminal or a server. The computer program constitutes a program module that may be stored on the memory of the electronic device. The computer program, when being executed by the processor, implements the operation of the method described in the embodiments of the present disclosure.

Embodiments of the present disclosure further provide a computer-readable storage medium. One or more non-volatile computer-readable storage media may include computer-executable instructions, when the computer-executable instructions are executed by one or more processors, the processors may perform the operations of the method of displaying the page of the third party application.

When a computer program product, which includes instructions, is running on a computer, the computer may perform the method of displaying the page of the third party application.

Any reference to a memory, a storage, a database or other medium used in the present disclosure may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), which is used as an external cache memory. As an illustration instead of a limitation, the RAM may be available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a memory bus (Rambus) direct RAM (RDRAM), and a direct memory bus dynamic RAM (DRDRAM), and a memory bus dynamic RAM (RDRAM).

The above described embodiments show only several embodiments of the present disclosure. The descriptions show specific details but shall not be interpreted as limiting the scope of the present disclosure. To be noted that, for any ordinary skilled person in the art, various variations and improvements can be made without departing from the conception of the present disclosure, and the variations and improvements shall be included in the scope of the present disclosure. Therefore, the scope of present disclosure shall be governed by the appended set of claims.

What is claimed is:

1. A method of displaying a page of a third party application, comprising:
    obtaining a background color and a foreground color in scripts of the third party application, in response to an activation command of activating the third party application and in response to an electronic device entering a power saving mode;
    adjusting the background color to a first color and adjusting the foreground color to a second color, wherein a brightness value of the first color is less than a first brightness threshold, a brightness value of the second color is greater than a second brightness threshold, and the first brightness threshold is less than or equal to the second brightness threshold;
    taking the first color to render a background region of the third party application, and taking the second color to render a foreground region of the third party application, to obtain a page of the third party application; and
    displaying the rendered page of the third party application;
    wherein, the adjusting the background color to a first color and adjusting the foreground color to a second color, comprises:
    obtaining a third brightness threshold, comparing the brightness value of the background color to the third brightness threshold, comparing the brightness value of the foreground color to the third brightness threshold;
    adjusting a part of the background color having a brightness value greater than or equal to the third brightness threshold to the first color, and adjusting a part of the foreground color having a brightness value less than the third brightness threshold to the second color; wherein the rest part of the background color having a brightness value less than the third brightness threshold remains unchanged, and the rest part of the foreground color having a brightness value greater than or equal to the third brightness threshold remains unchanged.

2. The method according to claim 1, wherein the taking the first color to render a background region of the third party application, and taking the second color to render a foreground region of the third party application, to obtain a page of the third party application, comprises:
    taking the first color and the part of the background color having the brightness value less than the third brightness threshold to render a corresponding background region of the third party application, and taking the second color and the part of the background color having the brightness value greater than or equal to the third brightness threshold to render the foreground region of the third party application, to obtain the page of the third party application.

3. The method according to claim 2, wherein before the obtaining a third brightness threshold, comparing the brightness value of the background color to the third brightness threshold, comparing the brightness value of the foreground color to the third brightness threshold, the method further comprises:
    obtaining an RGB value of the foreground color and an RGB value of the background color;
    converting the RGB value of the foreground color into an LAB value, converting the RGB value of the background color into another LAB value; and
    taking an L channel value in the LAB value of the foreground color as the brightness value of the foreground color, and taking an L channel value in the LAB value of the background color as the brightness value of the background color.

4. The method according to claim 1, further comprising:
    activating a dark mode of the third party application, in response to the activation command of activating the third party application, in response to the electronic device being in the power saving mode, and in response to the third party application having the dark mode; and
    obtaining the background color and the foreground color in the scripts of the third party application, in response to the activation command of activating the third party application, in response to the electronic device being in the power saving mode, and in response to the third party application not having the dark mode.

5. The method according to claim 1, wherein after the obtaining a background color and a foreground color in scripts of the third party application, the method further comprises:
    storing the background color and the foreground color in the scripts of the third party application;
    obtaining the stored background color and the stored foreground color in the scripts of the third party application in response to the electronic device exiting the power saving mode;
    taking the background color to render the background region of the third party application, taking the foreground color to render the foreground region of the third party application, updating the page of the third party application; and
    displaying the updated page of the third party application.

6. The method according to claim 1, further comprising:
    obtaining a focus element in the foreground region from the scripts of the third party application, wherein the focus element is an element in the page of the third party application and has a priority level higher than a priority threshold;

adjusting a color of the focus element to a focus color, wherein a contrast between the focus color and the first color is higher than a contrast threshold; and the taking the first color to render a background region of the third party application, and taking the second color to render a foreground region of the third party application, to obtain a page of the third party application, comprises:

taking the first color to render the background region of the third party application, taking the focus color to render the focus element, and taking the second color to render a part of the foreground region of the third party application that is occupied by any element other than the focus element, to obtain the page of the third party application.

7. The method according to claim 6, wherein the first color is black, the second color is white, and the focus color is blue.

8. The method according to claim 1, wherein the adjusting the background color to a first color and adjusting the foreground color to a second color, comprises:

obtaining a current ambient light intensity;

performing matching from correspondence between an ambient light intensity and a contrast based on the current ambient light intensity to determine a corresponding first contrast, wherein the ambient light intensity is positively correlated with the contrast; and determining the first color and the second color based on the first contrast, adjusting the background color to the first color and adjusting the foreground color to the second color.

9. The method according to claim 8, wherein after the displaying the rendered page of the third party application, the method further comprises:

in response to a change in the current ambient light intensity being detected, performing matching from the correspondence between the ambient light intensity and the contrast based on a new ambient light intensity to determine a new first contrast;

determining a new first color and a new second color based on the new first contrast;

taking the new first color to render the background region of the third party application, taking the new second color to render the foreground region of the third party application, updating the page of the third party application; and displaying the updated page of the third party application.

10. The method according to claim 1, wherein after the electronic device enters the power saving mode, the method further comprises:

obtaining a foreground color and a background color in scripts of a system application in response to an activation command of activating the systemic application in the electronic device;

adjusting the foreground color of the systemic application to a third color and adjusting the background color of the systemic application to a fourth color, wherein a brightness value of the third color is less than a fourth brightness threshold, a brightness value of the fourth color is greater than a fifth brightness threshold, and the fourth brightness threshold is less than or equal to the fifth brightness threshold;

taking the third color to render the background region of the systemic application, taking the fourth color to render the foreground region of the systemic application, to obtain a page of the systemic application; and displaying the rendered page of the systemic application.

11. The method according to claim 1, further comprising:

adjusting a refreshing rate of a screen of the electronic device to a first refreshing rate when the electronic device enters the power saving mode, wherein the first refreshing rate is within a range of refreshing rates of the screen and is less than a refreshing rate threshold;

detecting a current system state; and determining a target refreshing rate based on the current system state and adjusting the refreshing rate of the screen from the first refreshing rate to the target refreshing rate.

12. The method according to claim 11, wherein the current system state comprises a first system state or a second system state, a refreshing rate required by the first system state is higher than a refreshing rate required by the second system state;

the determining a target refreshing rate based on the current system state and adjusting the refreshing rate of the screen from the first refreshing rate to the target refreshing rate, comprises:

obtaining a first reference refreshing rate corresponding to the first system state in response to the current system state being the first system state, and adjusting the refreshing rate of the screen from the first refreshing rate to the first reference refreshing rate; and obtaining a second reference refreshing rate corresponding to the second system state in response to the current system state being the second system state, and adjusting the refreshing rate of the screen from the first refreshing rate to the second reference refreshing rate, wherein the first reference refreshing rate is higher than the second reference refreshing rate.

13. The method according to claim 1, further comprising:

determining a second contrast between the first color and the second color based on the first color and the second color;

performing matching from correspondence between a refreshing rate and a contrast based on the second contrast to determine a corresponding second refreshing rate, wherein the refreshing rate is negatively correlated with the contrast; and adjusting a refreshing rate of a screen to the second refreshing rate.

14. An electronic device, comprising a memory and a processor, wherein the memory stores a computer program, the computer program, when being executed by the processor, enables the processor to perform operations of:

obtaining a background color and a foreground color in scripts of the third party application, in response to an activation command of activating the third party application and in response to an electronic device entering a power saving mode;

adjusting the background color to a first color and adjusting the foreground color to a second color, wherein a brightness value of the first color is less than a first brightness threshold, a brightness value of the second color is greater than a second brightness threshold, and the first brightness threshold is less than or equal to the second brightness threshold;

taking the first color to render a background region of the third party application, and taking the second color to render a foreground region of the third party application, to obtain a page of the third party application; and displaying the rendered page of the third party application;

wherein, the adjusting the background color to a first color and adjusting the foreground color to a second color, comprises:

obtaining a third brightness threshold, comparing the brightness value of the background color to the third brightness threshold, comparing the brightness value of the foreground color to the third brightness threshold;

adjusting a part of the background color having a brightness value greater than or equal to the third brightness threshold to the first color, and adjusting a part of the foreground color having a brightness value less than the third brightness threshold to the second color; wherein the rest part of the background color having a brightness value less than the third brightness threshold remains unchanged, and the rest part of the foreground color having a brightness value greater than or equal to the third brightness threshold remains unchanged.

15. The electronic device according to claim 14, wherein while adjusting the background color to the first color and adjusting the foreground color to the second color, the computer program enables the processor to further perform operations of:

obtaining a third brightness threshold, comparing the brightness value of the background color to the third brightness threshold, comparing the brightness value of the foreground color to the third brightness threshold;

adjusting a part of the background color having a brightness value greater than or equal to the third brightness threshold to the first color, and adjusting a part of the foreground color having a brightness value less than the third brightness threshold to the second color; and the taking the first color to render a background region of the third party application, and taking the second color to render a foreground region of the third party application, to obtain a page of the third party application, comprises:

taking the first color and the part of the background color having the brightness value less than the third brightness threshold to render a corresponding background region of the third party application, and taking the second color and the part of the background color having the brightness value greater than or equal to the third brightness threshold to render the foreground region of the third party application, to obtain the page of the third party application.

16. The electronic device according to claim 15, wherein before obtaining the third brightness threshold, comparing the brightness value of the background color to the third brightness threshold, comparing the brightness value of the foreground color to the third brightness threshold, the computer program enables the processor to further perform operations of:

obtaining an RGB value of the foreground color and an RGB value of the background color;

converting the RGB value of the foreground color into an LAB value, converting the RGB value of the background color into another LAB value; and taking an L channel value in the LAB value of the foreground color as the brightness value of the foreground color, and taking an L channel value in the LAB value of the background color as the brightness value of the background color.

17. The electronic device according to claim 14, wherein the computer program enables the processor to further perform operations of:

activating a dark mode of the third party application, in response to the activation command of activating the third party application, in response to the electronic device being in the power saving mode, and in response to the third party application having the dark mode; and obtaining the background color and the foreground color in the scripts of the third party application, in response to the activation command of activating the third party application, in response to the electronic device being in the power saving mode, and in response to the third party application not having the dark mode.

18. The electronic device according to claim 14, wherein the computer program enables the processor to further perform operations of:

storing the background color and the foreground color in the scripts of the third party application;

obtaining the stored background color and the stored foreground color in the scripts of the third party application in response to the electronic device exiting the power saving mode;

taking the background color to render the background region of the third party application, taking the foreground color to render the foreground region of the third party application, updating the page of the third party application; and displaying the updated page of the third party application.

19. The electronic device according to claim 14, wherein the computer program enables the processor to further perform operations of:

obtaining a focus element in the foreground region from the scripts of the third party application, wherein the focus element is an element in the page of the third party application and has a priority level higher than a priority threshold;

adjusting a color of the focus element to a focus color, wherein a contrast between the focus color and the first color is higher than a contrast threshold; and the taking the first color to render a background region of the third party application, and taking the second color to render a foreground region of the third party application, to obtain a page of the third party application, comprises:

taking the first color to render the background region of the third party application, taking the focus color to render the focus element, and taking the second color to render a part of the foreground region of the third party application that is occupied by any element other than the focus element, to obtain the page of the third party application.

20. A non-transitory computer-readable storage medium, having a computer program stored, wherein the computer program, when being executed by a processor, is configured to implement operations of:

obtaining a background color and a foreground color in scripts of the third party application, in response to an activation command of activating the third party application and in response to an electronic device entering a power saving mode;

adjusting the background color to a first color and adjusting the foreground color to a second color, wherein a brightness value of the first color is less than a first brightness threshold, a brightness value of the second color is greater than a second brightness threshold, and the first brightness threshold is less than or equal to the second brightness threshold;

taking the first color to render a background region of the third party application, and taking the second color to render a foreground region of the third party application, to obtain a page of the third party application; and displaying the rendered page of the third party application;

wherein, the adjusting the background color to a first color and adjusting the foreground color to a second color, comprises:

obtaining a third brightness threshold, comparing the brightness value of the background color to the third brightness threshold, comparing the brightness value of the foreground color to the third brightness threshold;

adjusting a part of the background color having a brightness value greater than or equal to the third brightness threshold to the first color, and adjusting a part of the foreground color having a brightness value less than the third brightness threshold to the second color; wherein the rest part of the background color having a brightness value less than the third brightness threshold remains unchanged, and the rest part of the foreground color having a brightness value greater than or equal to the third brightness threshold remains unchanged.

* * * * *